US008382568B2

(12) United States Patent
Hall

(10) Patent No.: US 8,382,568 B2
(45) Date of Patent: Feb. 26, 2013

(54) BLACKJACK GAME WITH ADDITIONAL PLAYER FLEXIBILITY

(76) Inventor: Geoff Hall, Shirley (GB)

( * ) Notice: Subject to any disclaimer, the term of this patent is extended or adjusted under 35 U.S.C. 154(b) by 0 days.

(21) Appl. No.: 13/425,408

(22) Filed: Mar. 20, 2012

(65) Prior Publication Data

US 2012/0274025 A1 Nov. 1, 2012

Related U.S. Application Data

(63) Continuation of application No. 12/127,785, filed on May 27, 2008, now Pat. No. 8,157,632, which is a continuation-in-part of application No. 11/611,842, filed on Dec. 15, 2006, now abandoned.

(51) Int. Cl.
*A63F 13/00* (2006.01)
*A63F 1/00* (2006.01)

(52) U.S. Cl. .......................................... 463/12; 273/292

(58) Field of Classification Search .................... 463/12; 273/292
See application file for complete search history.

(56) References Cited

U.S. PATENT DOCUMENTS 6,485,020 B1 * 11/2002 Broadnax .................... 273/292

* cited by examiner

*Primary Examiner* — Peter DungBa Vo
*Assistant Examiner* — Jeffrey Wong
(74) *Attorney, Agent, or Firm* — Muskin & Cusick LLC

(57) ABSTRACT

A variation of casino blackjack. The player can have the option to split any two cards whether they are identical or not. The player can also double down and receive a double down card, and if the player does not like his or her double down card, then the player can discard the double down card and receive a second double down card.

8 Claims, 3 Drawing Sheets

BLACKJACK GAME WITH ADDITIONAL PLAYER FLEXIBILITY

CROSS REFERENCE TO RELATED APPLICATIONS

This application is a continuation of application Ser. No. 12/127,785 (which is incorporated by reference herein in its entirety), filed on May 27, 2008, now allowed, now U.S. Pat. No. 8,157,632 which is a continuation in part of application Ser. No. 11/611,842 (which is incorporated by reference herein in its entirety), filed on Dec. 15, 2006 now abandoned.

BACKGROUND OF THE INVENTION

1. Field of the Invention

The present inventive concept relates to a casino table game, and more particularly, to a variation of casino blackjack.

2. Description of the Related Art

The popularity of casino blackjack has been waning in recent years. Other games, such as poker variants and machine games have provided the standard blackjack game with some competition. Moreover, the standard blackjack game has become old and tiresome as gamblers have a limited attention span and like to see new and exciting games.

Therefore, what is needed is a new variation of blackjack which can provide a more enjoyable game than the standard version

SUMMARY OF THE INVENTION

It is an aspect of the present invention to provide an enjoyable variation of blackjack that can be played in a casino that some players may prefer over the standard game.

The above aspects can be obtained by a method that includes (a) receiving an initial wager from a player; (b) dealing a player's initial two cards and a dealer's hand; (c) allowing the player to double on the initial two cards by receiving a double wager from the player and dealing to the player a double card face up; (d) permitting the player to replace the double card, and if the player wishes to replace the double card, then replacing the double card with a replacement double card; and (e) continuing the blackjack game using standard rules with the player's point total comprising a sum of the initial two cards and the replacement double card.

The above aspects can also be obtained by a method that includes (a) receiving an initial wager from a player; (b) dealing a player's initial two cards and a dealer's hand; (c) allowing the player to split the two initial cards even if they are not of equal rank; and (d) continuing the blackjack game using standard rules.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
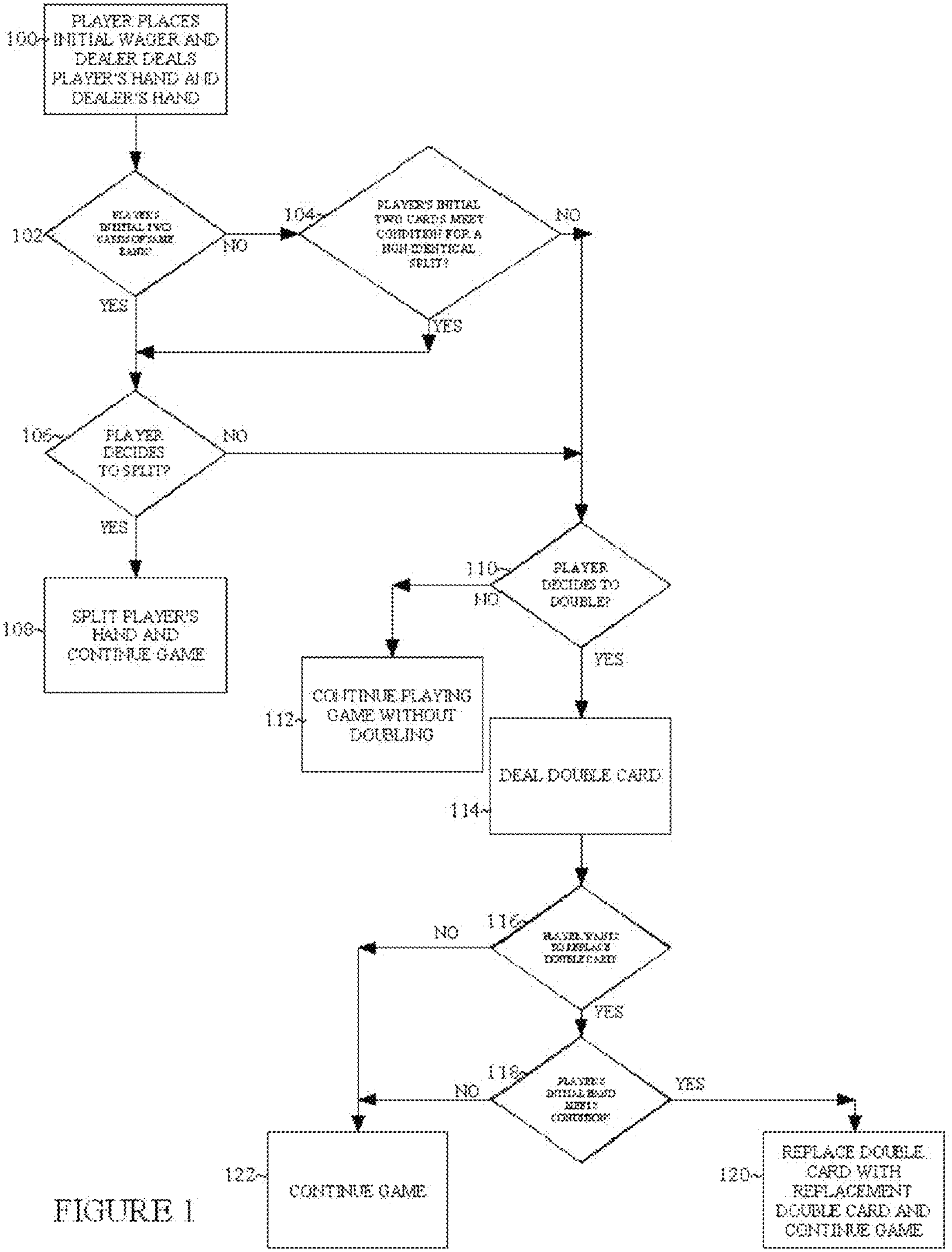
FIG. 1 is a flowchart illustrating an exemplary method of implementing a blackjack wagering game allowing for both splitting non-identical ranks and double card replacement, according to an embodiment.

Reference will now be made in detail to the presently preferred embodiments of the invention, examples of which are illustrated in the accompanying drawings, wherein like reference numerals refer to like elements throughout.

The present general inventive concept relates to a method, system, and computer readable storage which allows a casino to offer to at least one player a blackjack game which can provide a player with more flexible options than a standard game does.

In the standard game of blackjack, after a player places a first wager and receives his or her two cards, the player can only split cards that have a same rank (same numerical value but different suit). For example, if the player is dealt a five of hearts and five of diamonds, the player can split these. If the player is dealt two 10-valued cards, e.g., a ten of hearts and a jack of diamonds, typically the player would be allowed to split these as well. If the player is dealt a two of clubs and a three of diamonds, the player would not be allowed to split these since the rank values are not the same.

To split his or her cards, the player would place a second wager identical in value to the first wager on the table. The two cards then each become a separate hand and the player plays out each hand using each split card as a separate hand. The player may or may not be allowed to double on each hand after the player splits. For an example of splitting, if the player bets $5 and is dealt a five of hearts and a five of diamonds, and the dealer's upcard is a nine of spades. The player now splits by placing an additional $5 wager near the original wager, the dealer spreads the two cards apart, and the player continues to player each hand. For example, on the five of diamonds the dealer now deals a ten of hearts. The player decides to hit and receives an eight of hearts, which causes the player to bust. Thus, the player has lost the first $5 wager. Now the dealer deals a hand on the five of hearts. The dealer deals a six of spades, and the player hits again and receives a two of hearts, and the player hits again and receives a 5 of diamonds, and the player now stands, for a total of 18. The dealer then reveals the dealer's downcard and it turns out to be a ten of diamonds. Since the dealer has 19 and the player has 18, the player loses his other $5 wager. Thus, the player has lost $10. Of course, the player could have won both hands and won $10, or the player could have won one hand and lost the other hand and broken even.

Standard blackjack rules are known in the art and can be, for example: a six deck shoe, the dealer is dealt two initial dealer's cards, and the player is dealt two initial player's cards; aces count as one or eleven; the player may double on his or her initial two cards by placing a double wager and receive only one double card; the player may split cards of identical rank; the player may draw as many cards as he or she wishes, but if the player exceeds 21 then the player "busts" (loses). If the player does not bust, then the dealer exposes both the initial dealer's cards and continues to draw until the dealer has a point total of at least 17; player blackjacks pay 3:2.

In an embodiment which can be considered more desirable to players than the prior art blackjack game, the players can be allowed to split non-identical ranks. The player can split cards which do not have identical rank values, thus any two cards can be split. For example, if a player places a $2 wager and is dealt an initial two cards comprising a two of hearts and a three of diamonds, the player can split these by placing an equal wager of $2 and indicate to the dealer he or she wishes to split. The player can now play out each card (the two of hearts and the three of diamonds) separately. For example (assume the dealer's upcard is a seven), the player is dealt a nine on the two of hearts, then the player decides to double and places an additional $2 wager and receives a ten spades for the double card. The player then receives a six of hearts on the three of diamonds, and hits and receives a three of hearts, and then hits again and receive a king of diamonds, for a total of 22. The player has busted on the second hand and loses the wager of $2. The dealer reveals his downcard which his a ten of clubs. Thus, the dealer has 17 and the player has 21 on the first hand. The player wins, and since the player placed an original wager of $2 and a double wager of $2, the player wins $4. Thus, the player has a net win of $2 for this round.

Of course, to allow the player to split any two initial cards is advantageous to the player. In an embodiment, the player may be allowed to split any two initial cards. In a further embodiment, the player may be allowed to only split some initial two card combinations, for example the player may be allowed to split only cards with equal ranks (as in the prior art) or cards that fall into a certain subset (or range) or cards, for example cards from 4-9. Thus, under these rules, if the player is dealt a four and a five, the player can split. If the player is dealt a three and a five, the player cannot split because this pair of cards do not fall under the allowed conditions for splitting.

In a further embodiment, a condition for being allowed to split non identical ranks can be a point total range. For example, if the sum of the players two initial cards fall between a range of values, for example 14-16 (although any range(s) can be used), the player can be allowed to split his or her initial two cards. The player would typically still be allowed to split any two cards of identical rank (as currently done in the standard game). Thus, for example, if the player were dealt a seven and a six, the total is 13, and thus the player would not be allowed to split these under these conditions (since 13 is outside the range of 14-16). As another example, if the player was dealt a ten and a six, since this is a total of 16, the player would be allowed to split these. Since point totals of 14-16 are considered undesirable hands by the player, this feature can help the player enjoy the game more by giving the player more options than a standard game. Of course any point total(s)/range or sets of ranges can be used.

In a further embodiment, the player can be allowed to replace a double card with a new card. This variation can be offered with the split any pair feature described herein, or it can be offered on its own (and the split any pair feature can be offered on its own or with the replace a double card feature). In a further embodiment, the split non-identical ranks feature In a standard game of blackjack, when the player is dealt his or her first two cards, the player may wish to double his or her bet by placing a double wager alongside the player's original wager. Typically, the player will only be allowed to receive one additional card. For example, if the player is dealt a six and a five and the dealer's upcard is a five, the player may wish to double by placing a double wager (typically less than or equal to the initial wager). The player now receives a double card, for example a five, to give the player a total of 16. This is typically upsetting to the player, as 16 is not a good hand to have. However, in standard blackjack rules, the player would be stuck with the 16 and would have to hope that the dealer would bust.

In an embodiment, the player can double and if the player does not like his or her double card, the player can replace the double card with a new double card ("double card replacement"). This feature should typically be enjoyed by players as it will give the player a second chance to receive a good double card. If the player does not like his or her new double card the player is typically not permitted to go back to the first double card.

An example of how this can work is as follows. The player bets $1 and is dealt a six and a four (total 10), and the dealer's upcard is a five. The player now doubles and places a $1 double wager. The dealer deals the player a double card, which is a five. Since the player is unhappy with his current point total (15), the player indicates to the dealer that he or she wishes to replace the double card with a new card. Thus, the dealer removes the five and deals the player a new double card, for example a nine. The player's new total is now 19. Of course, this is a good hand in blackjack and thus the typically player would be happy. Now the dealer reveals the dealer's downcard to reveal a ten, and the dealers draws a seven to bust. The player has now won $2 (the $1 original wager plus the $1 double wager).

Double card replacement can be allowed by the casino any time the player wishes to double on the player's initial two cards. Further, double card replacement may be limited to only certain initial hands, for example when the player's initial two cards fall between a range of values, such as between 9-11 (either only hard 9-11 or any 9-11 including soft 9-11). Thus, for example, if the casino wishes to not allow double card replacement on soft point totals (totals involving an ace) the casino can do so at their option.

The features described herein ("split non-identical ranks" and "double card replacement) can be offered individually or in combination. Of course, these features give the player an additional mathematical advantage. Thus, the house would typically need to implement some type of compensating feature that works to the house's (dealer's) advantage in order for the house to still have a mathematical edge. Any compensating feature can be used.

One example of a compensating feature is taking ties (in other words players lose on a tie). Another compensating feature that can be used is pushing on certain dealer bust totals. For example, if the dealer busts with a hard point total of 22, instead of the player winning (if the player is still in the game), the player merely pushes (doesn't win or lose). Thus can be done for any chosen point total or totals, for example any one or more point totals from 22 to 26.

FIG. 1 is a flowchart illustrating an exemplary method of implementing a blackjack wagering game allowing for both splitting non-identical ranks and double card replacement, according to an embodiment.

The method can start with operation 100, wherein a player places an initial wager and a dealer deals a player's hand (two cards) and a dealer's hand (either one up card if the European rules is being used, or one up card and one downcard of the American rule is being used).

From operation 100, the method can proceed to operation 102, which determines whether the player initial two cards comprise a same rank (e.g., two sevens). Two ten valued cards can also be considered a same rank (e.g., queen and jack which can be split), although in another embodiment two non-same ten valued cards would not be considered a same rank and would not be allowed to be split (but a jack spades and a jack of diamonds would still be considered the same ten value).

If the determination in operation 102 determines that the initial two cards are of a same rank, then the method can proceed to operation 106 which determines whether the player decides to split. The player can indicate his desire to split to the dealer by placing an additional wager equal in size to the initial wager (although in a further embodiment the additional wager does not have to be equal in size) and optionally telling the dealer he or she wishes to split.

From operation 106, the method can proceed to operation 108, wherein the dealer splits the player's hand and the game continues as known in the art.

If the determination in operation 102 determines that the player's initial two cards are not of the same rank then the method can proceed to operation 104, which determines whether the player's initial two cards meet a predetermined condition(s) for a non-identical split. For example, if a sum of the player's initial two cards fall between a certain point total (e.g., 14-16), then this meets the condition. If the player's initial two cards meet the condition(s) for a non-identical split, then the method can proceed to operation 106. In an alternative embodiment, all initial two card hands can be split without meeting any condition.

If the determination in operation 104 determines that the player's initial two cards do not meet the condition(s) for a non-identical split, then the method can proceed to operation 110, which determines whether the player wishes to double. The player can indicate his or her desire to double by placing a double wager alongside the initial wager and optionally telling the dealer that he or she wishes to double If the determination in operation 110 determines that the player does not wish to double, then the method can proceed to operation 112, which continues the game without the player doubling.

If the determination in operation 110 determines that the player wishes to double, then the method can proceed to operation 114, which deals the player a double card.

From operation 114, the method can proceed to operation 116, which determines whether the player wants to replace the double card. The player can indicate to the dealer that he or she wishes to replace the double card by speaking this intent verbally and or performing a handle signal to this effect. If the player does not wish to replace the double card, then the method can proceed to operation 122, which continues the game using the initial hand and the double card dealt in operation 114.

If the determination in operation 116 determines that the player wants to replace the double card, then the method proceeds to operation 118 which determines whether the player's initial hand meets a predetermined condition(s) that must be met before the player is allowed to replace the double card. For example, the point total of the player's initial hand may have to be certain totals (e.g., 10-11) before the player is allowed to replace the double card. If the player's initial hand does not meet the predetermined condition for replacing the double card, then the player will not be allowed to have his or her double card replaced and the method can proceed to operation 122, wherein the game is continued using the player's initial hand and the double card dealt in operation 114.

If the determination in operation 118 determines that the player's initial hand does meet the predetermined condition for replacing the double card, then the method can proceed to operation 120, which replaces the double card with a replacement double card (dealt from the deck or shoe). The game then continues using the player's initial hand and the replacement double card.

It is noted that the method illustrated in FIG. 1 implements a game which allows both splitting non-identical ranks as well as replacing double cards. Alternatively, each of these features can be implemented without the other. For example, if the splitting non-identical ranks is to be implemented without the ability to replace double cards, then FIG. 1 would be modified as follows: From operation 114 the method would proceed to operation 122, without operations 116, 118, and 120. If the replacing double cards is allowed without the splitting non-identical ranks, then from operation 102, if the player's initial two cards are not of the same rank, then the method proceeds to operation to operation 110, and operation 104 is not performed.

It can also be appreciated that the operations in FIG. 1 can be performed in any sensible order. As just one example, the order of operations 116 and 118 can be switched.

Further, when a player splits, the player may or may not (depending on the variation being implemented by the casino) be allowed to double. If the player is allowed to double after a split, the player may or may not (depending on the variation being implemented by the casino) be allowed to replace the double card.

Figure 2:
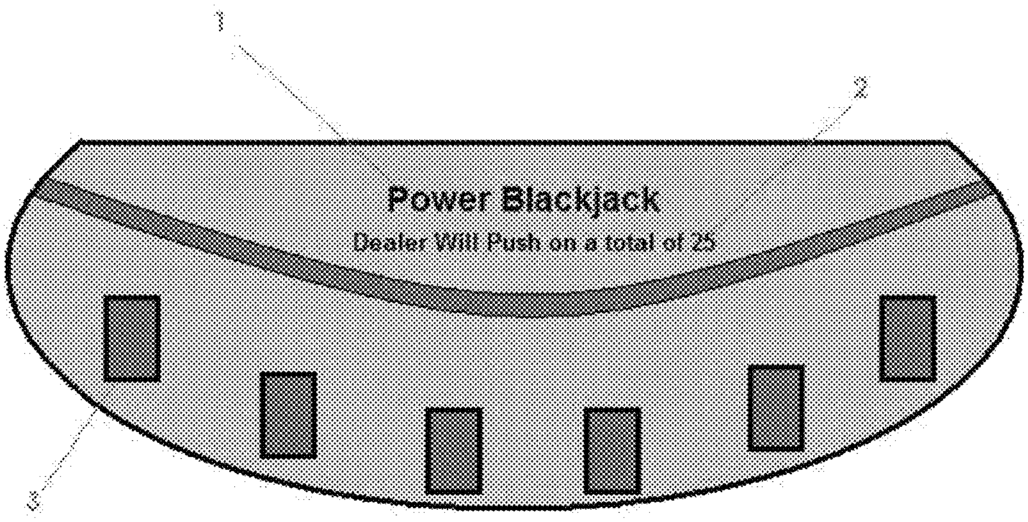
FIG. 2 is a diagram illustrating an exemplary table layout, according to an embodiment.

FIG. 2 is a diagram illustrating an exemplary table layout, according to an embodiment.

A dealer's area 1 is used to place the dealer's cards. A rules list 2 displays the rules of the game, especially those which may deviate from the standard game of blackjack. A player's hand area 3 is where the player's cards are dealt as well as where the player places his or her wagers.

Table I below illustrates one exemplary set of rules using features described herein. Of course the parameters in this table are merely exemplary and other parameters can be used as well.

TABLE I

1. Any number of decks can be used but at least four are recommended.
2. If the player's first two cards total hard 15 or 16 the player may split the two cards, even if they are not the same rank.
3. If the player's first two cards total 10 or 11 (and in some variations a 9) the player may do a "Power Double," in which the player may replace his double down card and exchange it for the next card in the shoe.
4. If the player did not bust and the dealer busts with 22 points the player's bet shall push.
5. The Power Double and Power Split may only be done on the first two cards.
6. The player may still do normal double and splits on the first two cards and after splitting, except in some versions double after split is not allowed.
7. If the player splits aces he shall only get one card per ace. Resplitting aces and drawing to split aces are not allowed.
8. Under the European rules if the player is allowed to surrender he may do so before the dealer checks for blackjack (known as early surrender).
9. A player blackjack on the first two cards shall pay 3 to 2.

Of course, different variations offered to players can result in different house advantages. Table II below illustrates several different variations and their respective house edges.

TABLE II

| Number | Hole Card Rule | Surrender | Dealer Hits S17 | Power Split | Power Double | Double after Split | House Edge |
|---|---|---|---|---|---|---|---|
| 1 | American | No | Yes | 15, 16 | 10, 11 | Yes | 0.55% |
| 2 | European | 2-10 | No | 15, 16 | 9-11 | Yes | 0.01% |
| 3 | European | All | No | 15, 16 | 10, 11 | Yes | 0.22% |
| 4 | European | 2-10 | No | 15, 16 | 10, 11 | Yes | 0.67% |
| 5 | European | No | No | 15, 16 | 9-11 | Yes | 0.23% |
| 6 | European | All | No | 15, 16 | 9-11 | No | −0.21% |
| 7 | American | No | Yes | 15, 16 | 10, 11 | No | 0.77% |
| 8 | American | No | No | 15, 16 | 10, 11 | No | 0.32% |

In Table II, the "Number" column refers to each different set of rules illustrated in the Table. Table II illustrates eight different variations of the blackjack using features described herein, although it can be appreciated that many other variations can also be offered using different parameters.

In Table II, the "Hole Card Rule" column refers to which dealer's hole card rule is used, either "American" or "European." In the American rule, if the dealer has a 10 or ace up the dealer will peek at the hole card for a blackjack, or use a device for such a purpose. If the dealer has a blackjack he or she will turn it over immediately. In the European rule, the dealer does not take a hole card at all. If the dealer does get a blackjack the player will lose his total amount bet.

In Table II, the "surrender" column refers to the ability of the player to surrender or not. Surrender is where the player can surrender his or her initial two cards for receiving 50% of their wager back. "No" refers to whether surrender is offered at all. "2-10" means the player may surrender against any dealer up card except an ace. "All" means the player may surrender any two card hand. In the American version the dealer will peek for a blackjack before insurance is offered. In the European version there is hole card to peek at, thus insurance is much stronger because it protects against a dealer blackjack.

In Table II, the "Dealer Hits S17" column refers to whether the dealer will hit on a soft 17.

In Table II, the "Power Split" column refers to the ability of the player to split his or her two initial card of non-identical rank (as described herein). These are the totals for each variation in which the player may power split on the first two cards.

In Table II, the "Power Double" column refers to the ability of the player to replace his or her double card (as described herein). These are the totals for each variation in which the player may do a power double on the first two cards. These are hard totals, although in another embodiment these can include soft totals as well.

In Table II, the "Double After Split" column refers to the ability of the player to double after he or she splits (whether splitting identical ranks or not).

In Table II, the "House Edge" column refers to the house edge of that particular variation if the player plays optimal strategy. The house edge can be defined as the ratio of the expected player loss to the initial bet. In order for the house to maintain a profit, the house edge typically needs to be positive. The house edge illustrated in Table II is not guaranteed to be accurate and may vary based on the type of analysis or simulation performed.

Two more examples of a game will now be presented. These examples use rule set 8 from Table II, with the player pushing if the dealer busts with a point total of 22. Using this rule set, if the player is dealt any totals other than hard 10, 11, 15, 16, then the game is played exactly in the same way as standard blackjack.

Mike places a $1 initial wager and is dealt a 7 and 4 and the dealer's upcard is a 5. Mike decides to double and places an additional $1 double wager and is now dealt a 3. Since Mike isn't happy with the 3 (for a point total of 14), mike decides to replace the double card (by telling the dealer). The dealer removes the double card (the 3) and replaces it with a replacement double card from the shoe which is a 9, for a point total of 20. The dealer will not play out the dealer's hand using standard blackjack rules, with the exception that if the dealer gets a hard 22 then the player pushes (unless the player has already busted in which the player already lost). The dealer now turns over a jack followed by a 7 for a point total of 22. Thus, the player pushes all of his wagers (neither wins or loses $2).

In a further example, Jason bets $5 and is dealt a Jack and a 5 verses a dealer's upcard of 8. The player decides to split the non-identical ranks since he can do so since the point total is 15 (according to this set of rules which allows splitting of point totals of 15-16). Jason places another $5 bet for the split hand. The dealer splits the Jack and 5 and starts by dealing the next card to the Jack. The dealer deals a 6 onto the Jack so that the player has a total of 16. In this example, the casino does not allow the player to split non-identical ranks more than once, so the player cannot split the Jack, 6 (although in another embodiment the casino will allow players to resplit non-identical ranks). The player can now decide to take additional cards or to 'stay'. In this case the player requests a 'hit' and receives a '2' to make 18. The player now 'stays' and the dealer moves to the next split hand which has a 5 as the first card. The dealer deals a 5 to the 5 so that the player has a total of 10. In this example, since this is a split hand, the casino would still allow the player to double the split hand but would not allow the player to then replace the double card. In an alternative embodiment, the casino would allow the player to replace the double card at the player's choice, even after a split. Jason elects to double and places a double wager of $5 receives a 7 to make a total of 17. The dealer plays his or her hand and, starting with the 8, turns over a 9 to make a total of 17. In this version 'ties' are 'pushed', as in the regular game, so the dealer will pay Jason's total of 18 and 'push' the player's total of 17. Thus, Jason wins $5 on the 18 but ties the $10 on the doubled hand, for a net win of $5.

In yet further embodiments, a player receiving a blackjack would win even though the dealer had achieved a bust point total which would have otherwise resulted in a player push. In an alternative embodiment, in the situation where the dealer's point total results in a player push, then a player blackjack could push also and the player would not win or lose.

In another embodiment, instead of paying blackjacks 3:2, blackjacks can be paid at any other payout, such as 1:1, 7:5, 6:5, etc. Alternatively, blackjacks can also be paid at a higher payout than 3:2 (e.g., 2:1).

In yet another embodiment, the conditions relating the ability to replace double cards and/or the ability to split non-identical ranks can apply to "soft" totals as well as "hard totals." In another embodiment, conditions for either (or both) of these abilities applies to hard totals only.

In a further embodiment, a player may continue to split non-identical ranks and identical ranks up to a predetermined amount of times, e.g., 4 times.

In a further embodiment, a game as described herein can be played on an electronic device, such as an electronic gaming machine (EGM). The game can also be played over a computer communications network, such as the Internet, and can also be offered at online casinos.

Figure 3:
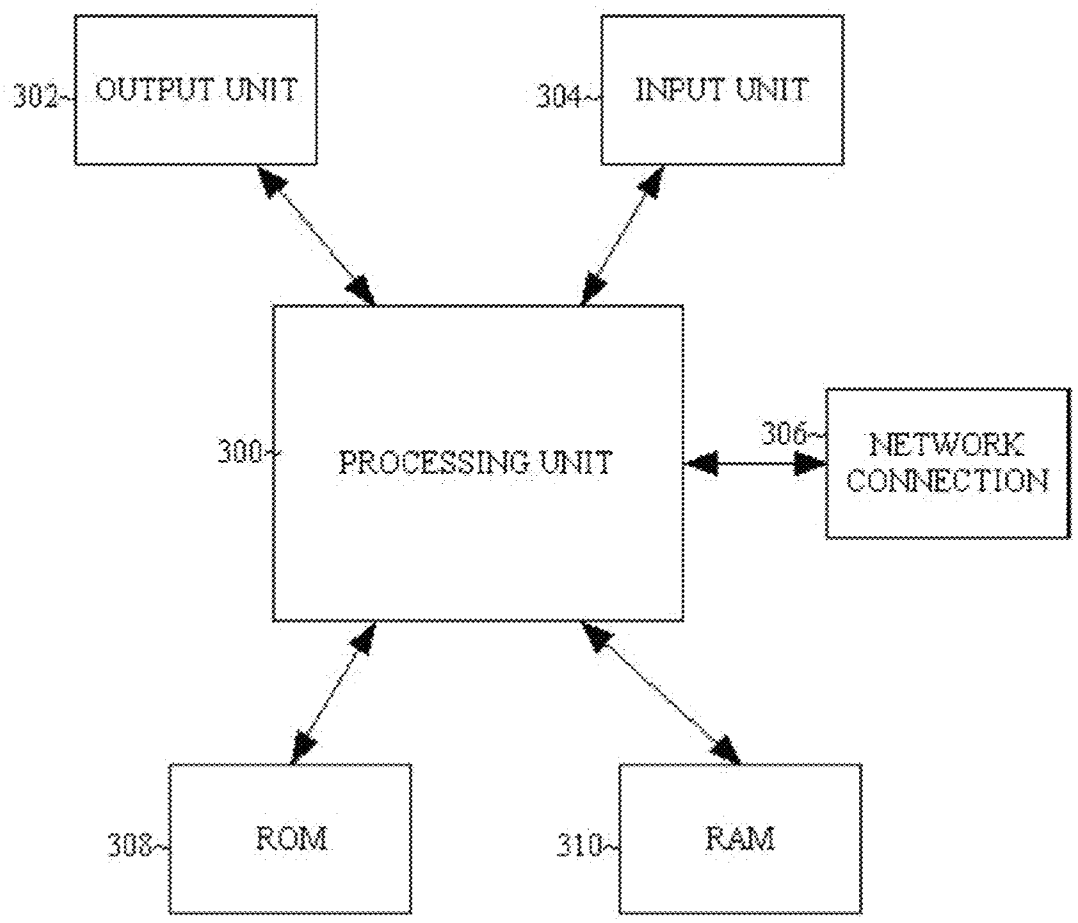
FIG. 3 is an exemplary block diagram of hardware that can be used to implement an electronic embodiment.

FIG. 3 is an exemplary block diagram of hardware that can be used to implement an electronic embodiment.

A processing unit 300 can be connected to an output unit 302 (e.g., LCD), an input unit 304 (e.g. a touch screen, keyboard, buttons, etc.), a network connection 306 (e.g. connection to a casino server or the Internet or other communication network), a ROM 308, a RAM 310, and any other hardware known in the art needed to implemented a digital version of the game (not pictured). The game can also be served to a remote client playing at an online casino over a computer communications network (such as the internet).

Any embodiments described herein can be played with a standard deck of cards or any type of special deck (e.g. a Spanish deck, etc.) The game can also be played with a single deck or multiple decks (e.g. 1-8 decks or more). Standard rules of blackjack can be used as well as any known variation of blackjack. Further, the order of any of the operations described herein can be performed in any order and wagers can be placed/resolved in any order. Any embodiments herein can also be played in electronic form and programs and/or data for such can be stored on any type of computer readable storage medium (e.g. CD-ROM, DVD, disk, etc.)

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a blackjack variation between a player and a dealer for a casino, the method comprising:

executing the following operations on an electronic processing unit:

receiving an initial wager from a player;

dealing a player's initial two cards and a dealer's hand;

providing doubling rules which comprise: a) offering the player an option to double on the initial two cards, and if the option to double is received from the player then receiving from the player a double wager and dealing to the player a double card face-up and a point total of the player equals a sum of the initial two cards and the double card; and b) if the option to double was received by the player then offering the player an option to replace the double card without requiring the player to place an additional wager, and if the option to replace the double card is received from the player then replacing the double card with a replacement double card without receiving any additional wager from the player and the point total of the player equals a sum of the initial two cards and the replacement double card;

implementing the doubling rules; and continuing the blackjack game using predefined rules.

2. The method as recited in claim 1, wherein the offering the player an option to replace the double card is offered to the player only if the player's initial two cards meet a predetermined condition.

3. The method as recited in claim 2, wherein the predetermined condition is a based on a point total of the initial two cards.

4. The method as recited in claim 3, wherein the point total of the initial two cards must be between 9 and 11.

5. The method as recited in claim 3, wherein the point total of the initial two cards must be between 10 and 11.

6. The method as recited in claim 1, wherein the blackjack variation contains a compensating feature which is favorable to the house.

7. The method as recited in claim 6, wherein the compensating feature is when the dealer busts with a particular point total, then the initial wager pushes.

8. The method as recited in claim 7, wherein the particular point total is one value between 22 and 26.

* * * * *